United States Patent
Teng et al.

(10) Patent No.: US 12,299,455 B1
(45) Date of Patent: *May 13, 2025

(54) RECONFIGURABLE INTERCONNECT WITH MULTIPLEXER FOR FLEXIBLE PROCESSOR PARTITIONING IN A SERVER COMPUTER

(71) Applicant: Amazon Technologies, Inc., Seattle, WA (US)

(72) Inventors: Shuwei Teng, Bothell, WA (US); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/795,264

(22) Filed: Feb. 19, 2020

(51) Int. Cl.
| | |
|---|---|
| *G06F 9/38* | (2018.01) |
| *G06F 9/50* | (2006.01) |
| *G06F 11/20* | (2006.01) |
| *G06F 15/173* | (2006.01) |
| *G06F 15/177* | (2006.01) |
| *G06F 15/78* | (2006.01) |

(52) U.S. Cl.
CPC .......... *G06F 9/3891* (2013.01); *G06F 9/5061* (2013.01); *G06F 9/5077* (2013.01); *G06F 11/2028* (2013.01); *G06F 15/17325* (2013.01); *G06F 15/17337* (2013.01); *G06F 15/177* (2013.01); *G06F 15/7871* (2013.01)

(58) Field of Classification Search
CPC .... G06F 9/5061; G06F 9/3885; G06F 9/3891; G06F 11/2028; G06F 15/17343; G06F 15/177; G06F 15/7871
See application file for complete search history.

(56) References Cited

U.S. PATENT DOCUMENTS

| | | | |
|---|---|---|---|
| 7,024,483 B2 * | 4/2006 | Dinker | H04L 41/12 709/204 |
| 7,398,380 B1 * | 7/2008 | Lovett | G06F 15/177 712/13 |
| 7,805,597 B2 * | 9/2010 | Cai | G06F 15/16 713/1 |
| 7,921,188 B2 * | 4/2011 | Oehler | G06F 9/5061 709/220 |

(Continued)

OTHER PUBLICATIONS

Wikipedia, "HyperTransport", Feb. 17, 2019, 7 pages.*

*Primary Examiner* — David J. Huisman
(74) *Attorney, Agent, or Firm* — Klarquist Sparkman, LLP

(57) ABSTRACT

A server computer can have multiple potential configurations depending on a state of an input signal. Interconnect buses between processors in a server computer can be reconfigured on startup or dynamically ("hot add/drop") by one or more multiplexers, thereby allowing the server computer to be flexibly partitioned into custom arrangements of processors, to maximize or change interconnect bandwidth between connected processors in a partition, or to minimize or reduce impact ("blast radius") due to failed processors or interconnect buses. Each processor can have its own configuration logic to allow partitioning of the server computer as small as a single socket. In an alternative configuration, a common configuration logic can be partitioned and act as separate configuration logics for each partition.

7 Claims, 11 Drawing Sheets

(56) References Cited

U.S. PATENT DOCUMENTS

| | | | | |
|---|---|---|---|---|
| 2013/0067197 A1* | 3/2013 | Liu | ................... | G06F 15/167 |
| | | | | 712/29 |
| 2017/0212707 A1* | 7/2017 | Hildebrand | ........... | G06F 3/0617 |
| 2018/0181536 A1* | 6/2018 | Liao | ................. | G06F 15/17343 |

* cited by examiner

RECONFIGURABLE INTERCONNECT WITH MULTIPLEXER FOR FLEXIBLE PROCESSOR PARTITIONING IN A SERVER COMPUTER

BACKGROUND

Server computers, including those operating in a datacenter environment, can include multiple processors. Configuration of the processors is typically limited to the design provided by the processor's manufacturer. Modification of existing platforms is needed to provide more flexibility in terms of server computer configuration and to limit the impact of processor failure on the rest of the server computer.

BRIEF DESCRIPTION OF THE DRAWINGS

FIG. 1A also illustrates the server computer in a four-partition setup.

DETAILED DESCRIPTION

Figure 1A:
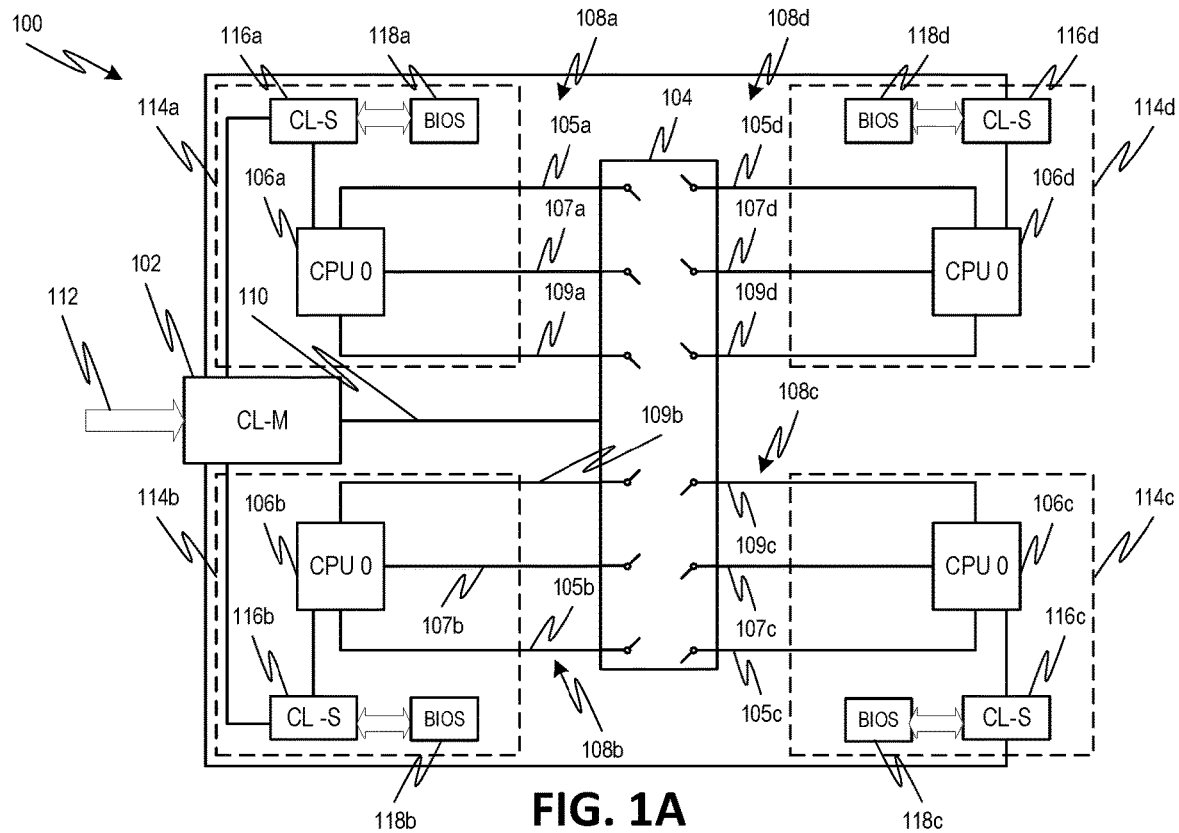
FIG. 1A is a simplified schematic diagram of a server computer, including one or more multiplexers for reconfiguration of interconnects buses to arbitrarily control the partitioning or topology architecture, according to one or more embodiments of the disclosed subject matter.

Interconnect buses between processors in a server computer can be reconfigured on startup or dynamically ("hot add/drop") by one or more multiplexers, thereby allowing the server computer to be flexibly organized into desired numbers of partitions (each with a given number of processors), to maximize or change interconnect bandwidth between connected processors in a partition, or to minimize or reduce impact ("blast radius") of failed processors or interconnect buses. Each processor can have its own configuration logic to allow partitioning of the server computer as small as a single socket. In an alternative configuration, a common configuration logic can be partitioned and act as separate configuration logics for each partition. For example, a 4-socket processor server can be reconfigured into four single-processor systems, two two-processor systems with three interconnect buses, or a single four-processor fully-connected system. In another example, an 8-socket processor server can be reconfigured into two four-processor fully-connected systems or a single eight-processor system. Other arbitrary interconnect topology and/or partitioning are also possible.

FIGS. 1A-1D illustrate an exemplary server computer 100 that can be reconfigured to provide multiple configuration alternatives based on an input signal 112 received at an input port of configuration logic (CL) 102. For example, server computer 100 can include four processors 106a-106d. Based on input signal 112, the server computer 100 can be configured as a single-platform (e.g., as in FIG. 1C), as a dual-platform (e.g., as in FIG. 1B), or as a multi-platform (e.g., as in FIG. 1A). The separate platforms can be logically independent from each other, with each running a separate operating system having different memory maps, separate memory, etc. Each platform can further include its own separate configuration logic 116a-116d, which may operate in a servant relationship (CL-S) to configuration logic 102 operating as a master (CL-M). Master configuration logic 102 and/or servant configuration logic 116a-116d can be an integrated circuit (IC), such as a field programmable gate array (FPGA) or an application-specific IC (ASIC).

As illustrated in FIGS. 1A-1D, each processor 106a-106d has a corresponding bus set 108a-108d coupled thereto for providing communication with other processors. Each bus set 108a-108d can have interconnect buses corresponding to interconnect links of each processor 106a-106d. The interconnect bus sets 108a-108d can be any of a variety of bus types, but generally provide for communication between connected processors using a coherent protocol. Example bus types for the interconnect bus sets 108a-108d include Direct Media Interface (DMI) bus (manufactured by Intel® Corporation), Ultra Path Interconnect (UPI) bus (manufactured by Intel® Corporation), and Infinity Fabric (IF) bus (manufactured by Advanced Micro Devices, Inc.), but other coherent communication bus types can be used. For example, each processor 106a-106d has three interconnect links with first interconnect buses 105a-105d, second interconnect buses 107a-107d, and third interconnect buses 109a-109d respectively coupled thereto. Different numbers of interconnect links (and corresponding number of interconnect buses of each bus set 108a-108d) are also possible according to one or more contemplated embodiments, for example, based on the design or type of processor 106a-106d.

The server computer 100 includes a multiplexer 104 that is coupled to bus sets 108a-108d from each processor 106a-106d and can be used to enable and/or reroute the interconnect buses between processors to effect the platform configuration or interconnect topology specified by input signal 112. For example, the multiplexer 104 can be a type of peripheral component interconnect (PCI) switch or any other switch that allows signals between processors without compromising the coherent communication protocol. The multiplexer 104 can be mounted on, or form part of, the same motherboard or other printed circuit board as processors 106a-106d and configuration logic 102. The multiplexer 104 is coupled to master configuration logic 102 via input line 110, through which the configuration logic 102 provides an appropriate control signal to the multiplexer 104.

Although only one multiplexer 104 is illustrated in FIG. 1A, additional multiplexers can be used. For example, the same function offered by multiplexer 104 can be achieved using two or more separate multiplexer units. Moreover, although all of the first interconnect buses 105a-105d, second interconnect buses 107a-107d, and third interconnect buses 109a-109d are shown as connected to multiplexer 104, it is also possible for fewer than all of the interconnect buses to be connected by multiplexer 104 according to one or more contemplated embodiments. For example, first interconnect buses 105a-105d may be left disconnected from multiplexer 104, whereby first interconnect bus 105a would directly connect to first interconnect bus 105d and first interconnect bus 105b would directly connect to first interconnect bus 105c. In such an example, the first interconnect buses 105a-105d would thus limit the number of processors per partition to no less than two.

In the multi-platform configuration shown in FIG. 1A, each processor 106a-106d is in its own respective partition 114a-114d. Based on the configuration signal 112, the master configuration logic 102 applies an appropriate control signal to the multiplexer 104 via input line 110. The control signal causes the multiplexer 104 to disable connections between each of the interconnect sets 108a-108d, resulting in the separate partitions 114a-114d. The master configuration logic 102 also sends an enabling control signal to each servant configuration logic 116a-116d in each partition 114a-114d. For example, with Intel® processors, each servant configuration logic 116a-116d may act as a Platform Controller Hubs (PCH) for the corresponding partition 114a-114d. Each servant configuration logic 116a-116d can boot up the respective processor 106a-106d using a respective BIOS 118a-118d. Alternatively, the server computer 100 can be configured (e.g., via appropriate programming) to allow changes to be made to interconnect bus sets 108a-108d in real-time as the processors 106a-106d operate (i.e., "hot" add or delete). The master configuration logic 102 or the respective servant configuration logic 116a-116d can set respective addresses so that all processors 106a-106d are at a same address (e.g., CPU 0), because separate memory maps are used and the processors are otherwise isolated from each other by interconnect sets 108a-108d disabled by multiplexer 104. The server computer 100 can thus provide four partitions 114a-114d, each with a single processor therein operating independently of the other processors in the server computer.

Figure 1B:
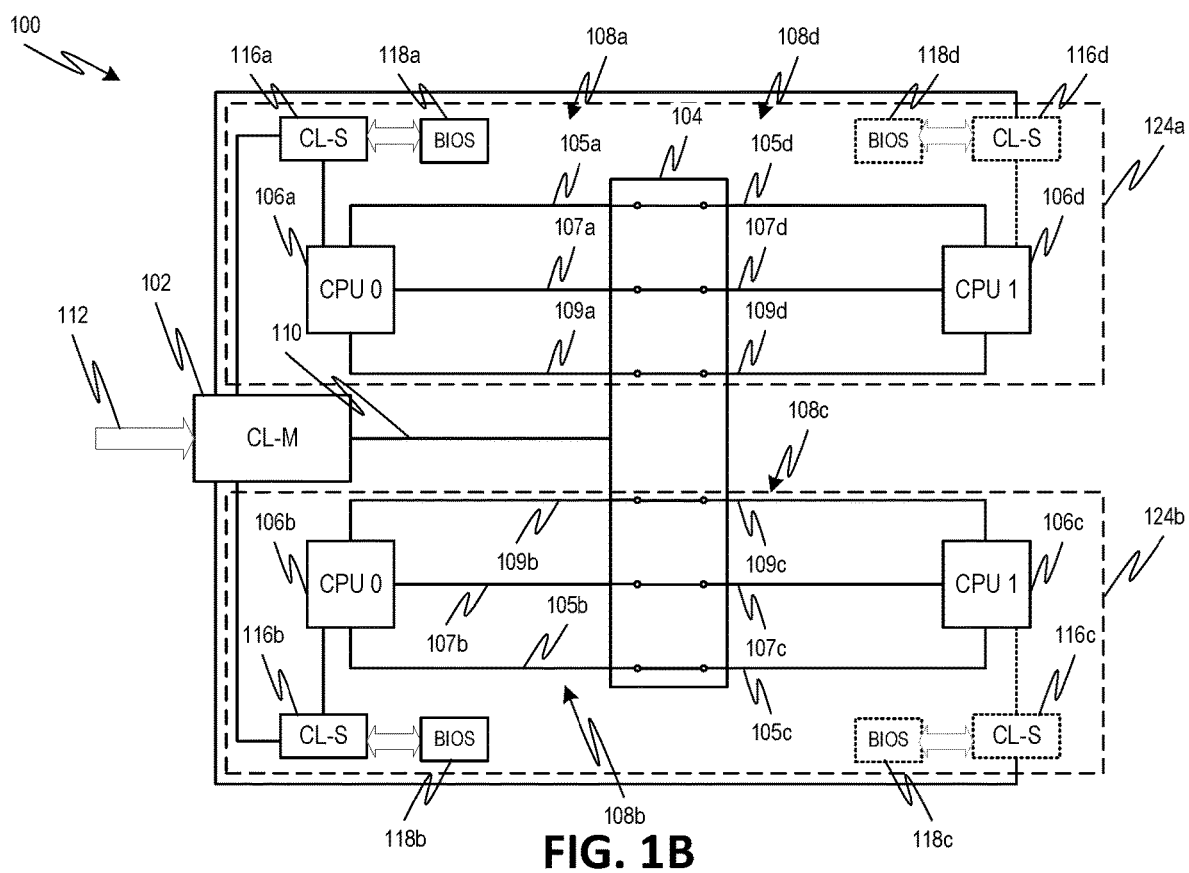
FIG. 1B illustrates an exemplary configuration for the server computer of FIG. 1A in a two-partition setup.

In the dual-platform configuration shown in FIG. 1B, a first partition 124a is formed with two processors 106a, 106d, and a second partition 124b is formed with two processors 106b, 106c. Based on the configuration signal 112, the master configuration logic 102 applies an appropriate control signal to the multiplexer 104 via input line 110. The control signal causes the multiplexer 104 to connect together bus sets 108a and 108d, and to separately connect together bus sets 108b and 108c. When each bus set 108a-108d includes multiple interconnect buses, the multiplexer 104 can respectively connect together each interconnect bus in the bus sets, thereby enabling multiple "lane" communication between connected processors. The multiple interconnect buses between connected processors in each partition may offer higher bandwidth communication than would otherwise be possible using just a single interconnect bus.

The master configuration logic 102 also sends an enabling control signal to only one servant configuration logic in each partition 124a, 124b. For example, servant configuration logic 116a in partition 124a and servant configuration logic 116b in partition 124b can be enabled, while servant configuration logic 116d in partition 124a and servant configuration logic 116c in partition 124b can be disabled. Enabled servant configuration logic 116a in partition 124a can boot up both processors 106a, 106d using a first BIOS 118a. Enabled servant configuration logic 116b in partition 124b can boot up both processors 106b, 106c using a second BIOS 118b. Alternatively, as noted above, the server computer 100 can be configured (e.g., via appropriate programming) to allow "hot" changes to form partitions 124a, 124b without reboot.

Servant configuration logic 116a can further set the address for processor 106a as a first address (e.g., CPU 0) and the address for processor 106d as a different second address (e.g., CPU 1). Servant configuration logic 116b can assign addresses for processors 106b, 106c in the second partition 124b in a similar manner as the first partition 124a, since the two partitions employ separate memory maps and the partitions are otherwise isolated from each other by the interconnect routing via multiplexer 104. Within the first partition 124a, both processors 106a, 106d operate in a common first memory map of the system, and the connected bus sets 108a, 108d allow coherent inter-processor communication so that the processors 106a, 106d can cooperate in servicing the first platform. Similarly, within the second partition 124b, both processors 106c, 106b operate in a common second memory map different from the first memory map, and the connected bus sets 108c, 108b allow coherent inter-processor communication so that the processors 106b, 106c can cooperate in servicing the second platform. The server computer 100 can thus provide two independently operating platforms, each with two processors therein that are isolated from processors in the other platform.

Figure 1C:
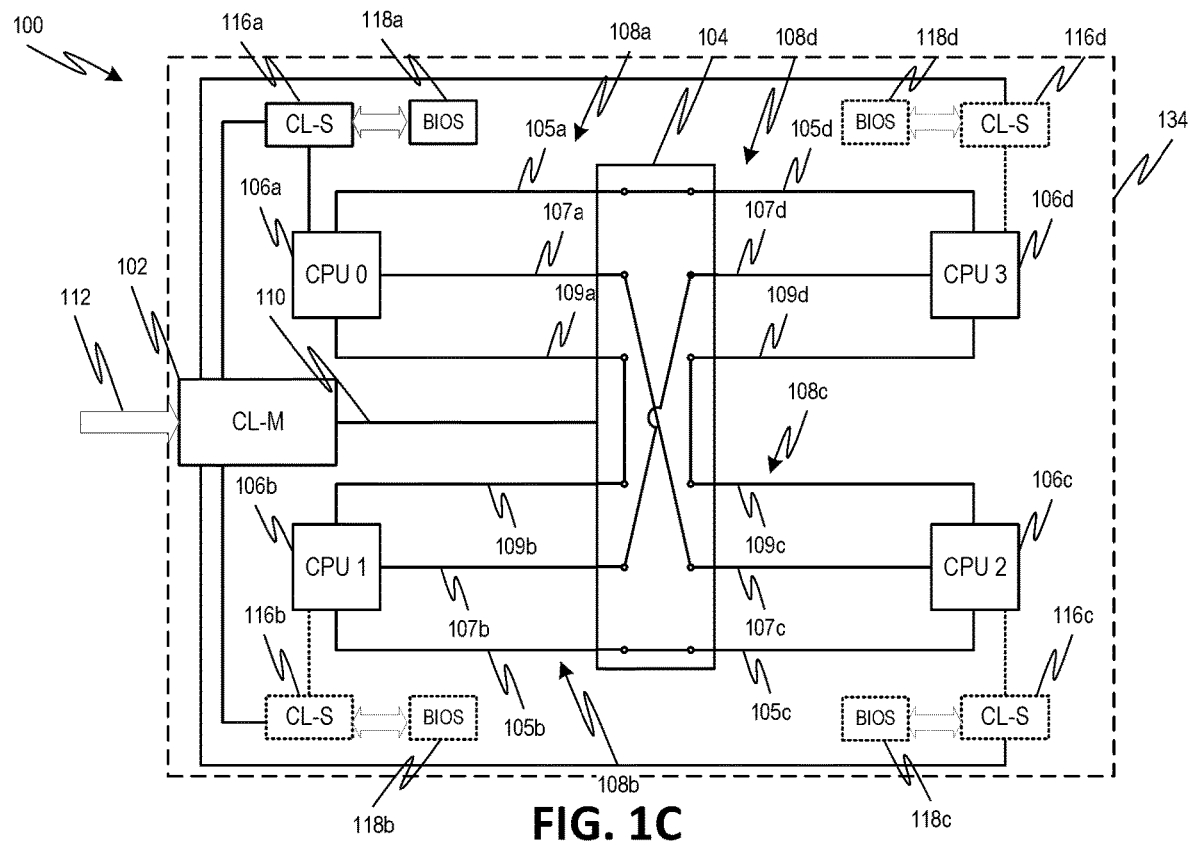
FIG. 1C illustrates an exemplary configuration for the server computer of FIG. 1A in a single-partition setup.

In the single-platform configuration shown in FIG. 1C, a single partition 134 is formed with all four processors 106a-106d therein. Based on the configuration signal 112, the master configuration logic 102 applies an appropriate control signal to the multiplexer 104 via input line 110. The control signal causes the multiplexer 104 to connect together corresponding interconnect buses from each bus set 108a-108d in a fully connected configuration. In other words, each processor is connected to the three other processors by respective interconnect buses in the bus set. For example, processor 106a is connected to processor 106d via first interconnect buses 105a, 105d, to processor 106c via second interconnect buses 107a, 107c, and to processor 106b via third interconnect buses 109a, 109b.

The master configuration logic 102 also sends an enabling control signal to only one servant configuration logic in the entire partition 134. For example, servant configuration logic 116a can be enabled, while all other servant configuration logics 116b-116d are disabled. Enabled servant configuration logic 116a can boot up all processors 106a-106d using first BIOS 118a. Alternatively, as noted above, the server computer 100 can be configured (e.g., via appropriate programming) to allow "hot" changes to form partition 134 without reboot.

Servant configuration logic 116a can further set the address for processor 106a as a first address (e.g., CPU 0), the address for processor 106b as a different second address (e.g., CPU 1), the address for processor 106c as a different third address (e.g., CPU 2), and the address for processor 106d as a different fourth address (e.g., CPU 3). Within the single partition 134, all processors 106a-106d operate in a common memory map of the system, and the connected bus sets 108a-108d allow coherent inter-processor communication so that the processors 106a-106d can cooperate in servicing the single platform. The server computer 100 can thus provide a single partition 134 operating with all of the processors 106a-106d interconnected. The single-platform mode configures the server computer 100 as having a single memory map and a single operating system executing on the server computer.

Figure 1D:
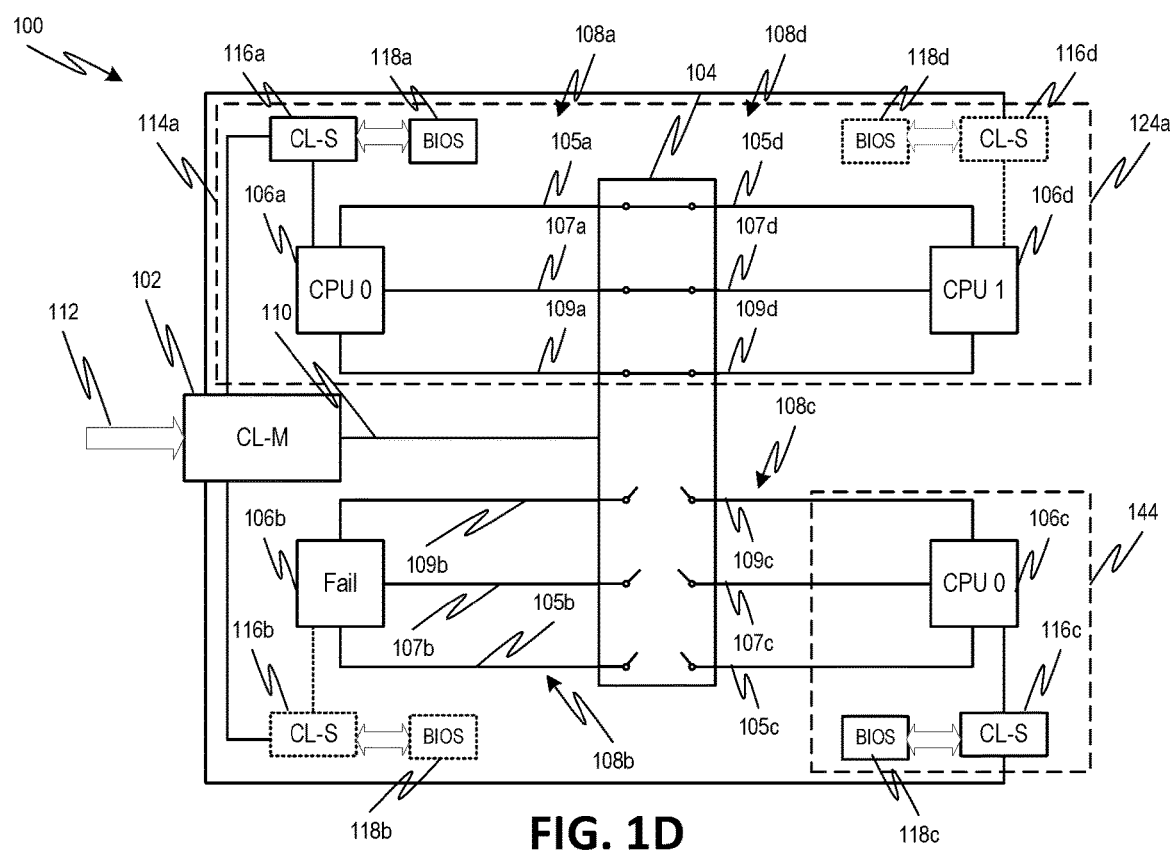
FIG. 1D illustrates an exemplary configuration for the server computer of FIG. 1A to limit impact of failure of one of the processors.

In some embodiments, the server computer 100 can reallocate interconnect buses to account for or at least reduce the impact of an error condition (e.g., blast radius), for example, due to a faulty or defective processor or interconnect bus. For example, FIG. 1D illustrates the server computer 100 in a blast radius mitigation configuration. The server computer 100 may have been operating in a dual-platform configuration as in FIG. 1B prior to failure of or other defect associated with processor 106b. The failure may be detected by the server computer 100 (e.g., configuration logic 102) or by another system component (e.g., baseboard management controller) to generate a configuration signal 112 indicating the error or requesting a mitigating configuration.

Based on the configuration signal 112, the master configuration logic 102 applies an appropriate control signal to the multiplexer 104 via input line 110. For example, the master configuration logic 102 can instruct the multiplexer 104 to disconnect the bus set 108b associated with failed processor 106b from other processors in the server computer 100. In the example of FIG. 1D, bus set 108b would thus be disconnected from bus set 108c. Alternatively or additionally, the multiplexer 104 may disconnect less than all of the interconnect buses in the affected bus set, for example, when one of the interconnect buses is defective but the other interconnect buses and connected processors otherwise remains operational.

The master configuration logic 102 may also send appropriate control signals to one or more servant configuration logics in the affected partition. For example, servant configuration logic 116c can be enabled, thereby converting the two-processor partition 124b of FIG. 1B into single-processor partition 144 illustrated in FIG. 1D. The master configuration logic 102 or the servant configuration logic 116c can further reset the address for processor 106c to a different address (e.g., CPU 0) to account for the reduction in number of processors in the partition.

Thus, the configuration hardware logic 102 receives the input signal 112, and, based on its state, determines how to configure processors 106a-106d, servant configuration logic 116a-116d, and multiplexer 104 to set the processors in a specific platform mode (e.g., single-partition, dual-partition, multi-partition, etc.), or to mitigate or isolate defects or failures from connected processors in the platform. Alternatively or additionally, using one or more multiplexers 104, the configuration hardware logic 102 may arbitrarily reconfigure the interconnect topology to certain advantage. For example, by appropriate switching of one or more multiplexers, the number of interconnect buses connecting two or more processors can be increased on an ad hoc basis to address interconnect bandwidth demands. In another example, by appropriate switching of one or more multiplexers, processors can be added to an existing partition on an ad hoc basis to address processing demands, e.g., for a virtual machine running in the partition. In still another example, appropriate switching of one or more multiplexers can be used to reroute interconnect buses around a failed processor or to reestablish a specified number of processors in the partition after a processor or interconnect fails. In some embodiments, reconfigurability of the interconnect topology can be achieved via a cascade of sequential two-state multiplexers (e.g., input port switched between two outputs), sequential three-state multiplexers (e.g., input port switched between two outputs and a disabled state), or any other multiplexer type.

Although the figures and accompanying discussion herein may describe processors as central processing units (CPUs), embodiments of the disclosed subject matter are not limited thereto. Rather, each processor (e.g., processors 106a-d in FIGS. 1A-D, processors 370-373 in FIG. 3, processors 406a-406h in FIGS. 4A-4C, processors 620A-620D in FIG. 6, processors 710, 715 in FIG. 7) can be a general-purpose CPU, processor in an application-specific integrated circuit (ASIC), a field-programmable gate array (FPGA), a graphics processing unit (GPU), an accelerator, or any other type of processor.

Figure 2A:
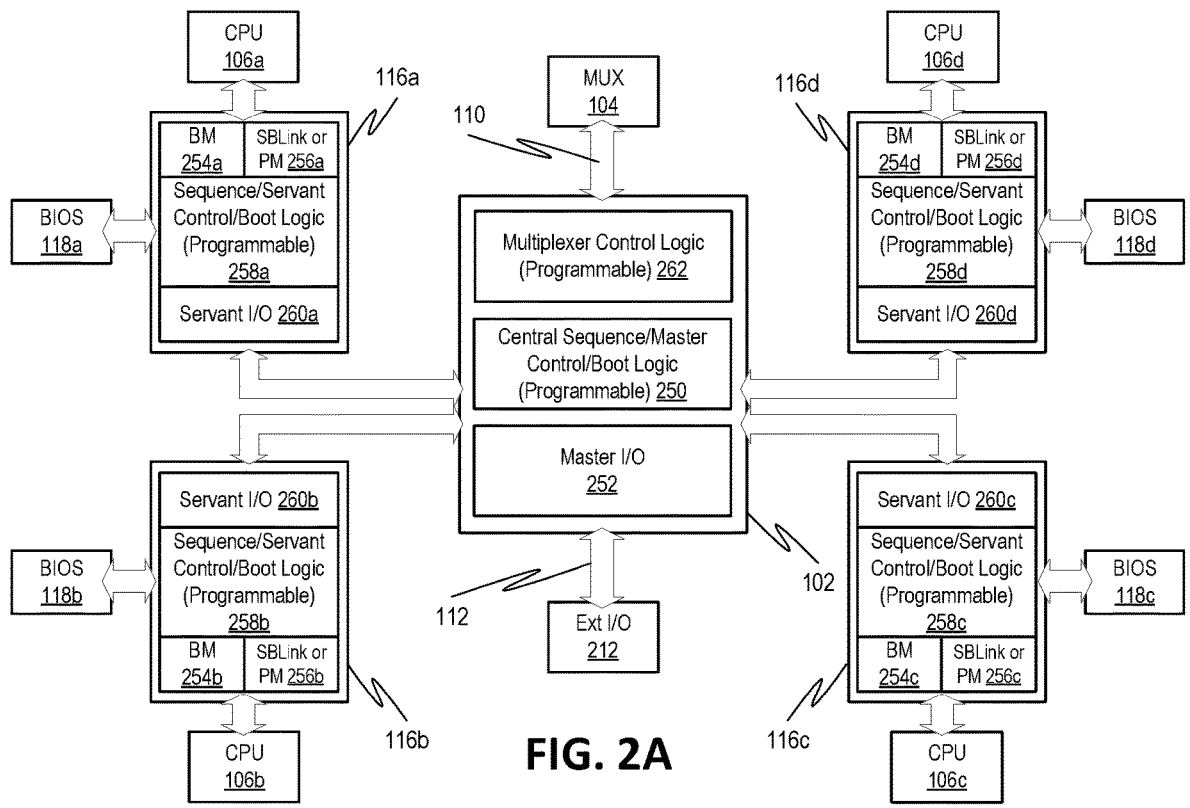
FIG. 2A illustrates details of a master-servant setup for configuration logic of the server computer, according to one or more embodiments of the disclosed subject matter.

FIG. 2A shows further details of the configuration hardware logic setup of FIGS. 1A-1D. The server computer can include separate servant configuration hardware logics 116a-116d for each processor 106a-106d and a master configuration hardware logic 102 for the entire system. Each servant configuration logic 116a-116d can be similarly configured, with a respective bus manager 254a-254d, sideband link or power manager 256a-256d (which may act as a secondary communication bus), and programmable sequence/boot logic 258a-258d. Each bus manager 254a-254d can monitor a respective communication bus between the configuration logic 116a-116d and the corresponding processor 106a-106d. The bus managers 254a-254d can provide logic for transmitting or receiving data over the respective communication buses using protocols for communicating with processors 106a-106d.

The side-band link or power managers 256a-256d can provide management for alternative communication channels between the servant configuration logic 116a-116d and the respective processors 106a-106d. For example, the side-band link or power managers 256a-256d can provide hardware logic for communicating with the processors 106a-106d using a predefined protocol. Power information or other desired performance data can be passed via the side-band links. The sequence/boot logic 258a-258d communicates with its respective BIOS 118a-118d and can configure the respective processors 106a-106d, for example, after power-on or reset. Each servant configuration logic 116a-116d can also include general purpose input/output (I/O) modules 260a-260d, which can be used to allow communication between separate partitions when in a multiple-partition mode as well as to provide communication with the master communication hardware logic 102.

The servant configuration hardware logics 116a-116d can be connected to the master configuration hardware logic 102 via respective communication buses. Based on the platform indicated by the input signal 112, the master configuration hardware logic 102 can separately enable or disable the servant configuration logics 116a-116d to achieve the desired platform configuration or interconnect topology. The master configuration logic 102 can have a programmable central sequence/boot logic 250, multiplexer control logic 262, and an I/O module 252. The central sequence/boot logic 250 can control operation of the servant configuration logics 116a-116d, while the multiplexer control logic 260 can control operation of the multiplexer 262, for example, after power-on/reset or during operation of the processors 106a-106d. The I/O module 252 can allow for communication between the master configuration logic and servant configuration logics prior to and after partitioning, or can allow for communication between the separate partitions when in a multi-partition mode.

The master configuration logic 102 can receive the input signal 112 at an input port, and can send appropriate control signals to each servant configuration logic 116a-116d and control signal 110 to the multiplexer 104 to route or disable interconnect buses between processors 106a-106d. The input signal 112 can be received from a variety of sources depending on the design. For example, the input signal 112 can be from a module or device 212 separate from the configuration logic 102, such as an embedded controller (EC) positioned on a motherboard of the server computer 100, a baseboard management controller (BMC), or any other I/O module (e.g., specifications from management server computer 604 or administrator server 640 in FIG. 6).

Figure 2B:
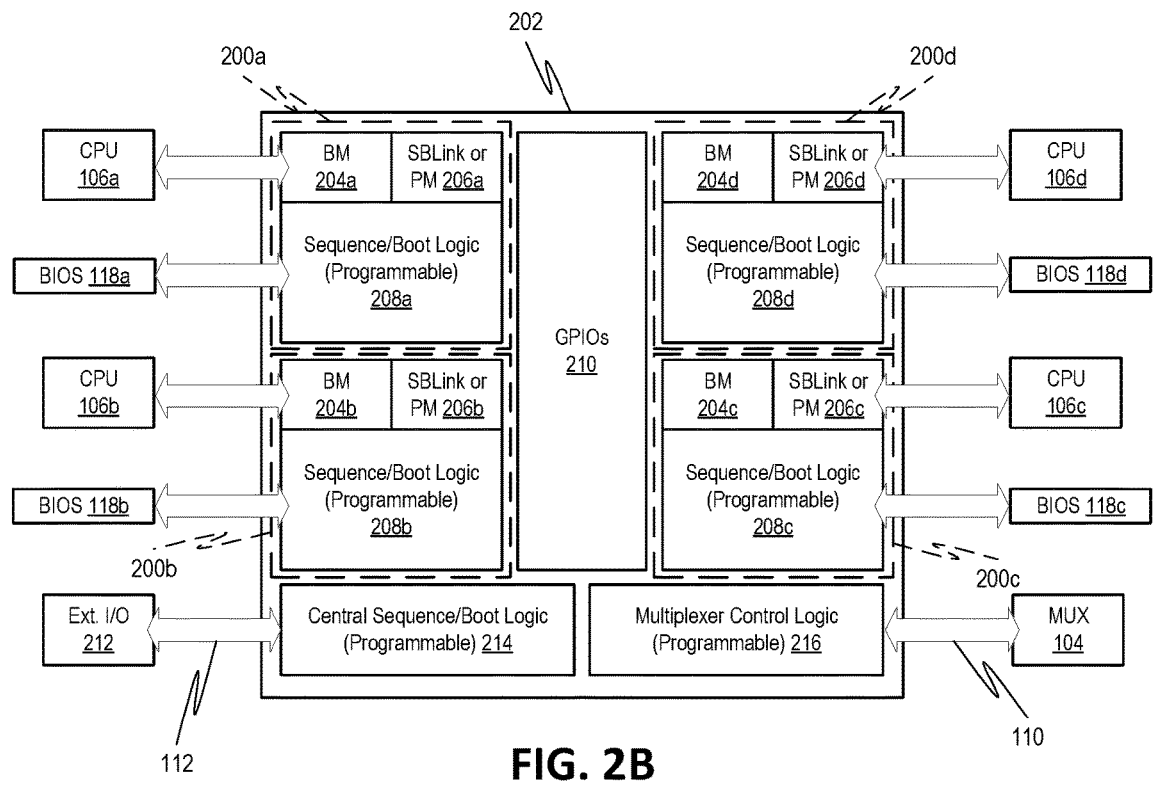
FIG. 2B illustrates details of an alternative setup for configuration logic of the server computer, according to one or more embodiments of the disclosed subject matter.

Alternatively, in some embodiments, the above-described master-servant configuration logic setup can instead be replaced with a common configuration hardware logic for the server computer. For example, as shown in FIG. 2B, a common configuration hardware logic 202 can be used in place of master configuration hardware logic 102 and servant configuration hardware logics 116a-116d in FIGS. 1A-2A. The common configuration hardware logic 202 can include separate parts 200a-200d for each processor 106a-106d, with each part 200a-200d mimicking the above-described functionality otherwise offered by separate servant configuration logics 116a-116. In particular, for each processor 106a-106d, the configuration logic 202 includes a bus manager 204a-204d, a side-band link or power manager 206a-206d, and a programmable sequence/boot logic 208a-208d.

The sequence/boot logics 208a-208d communicate with their respective BIOS 106a-106d and can configure the respective processors 106a-106d based on the specified platform setup. A general purpose I/O (GPIO) 210 can be used to allow communication between the separate partitions when in a multiple-partition mode. A central sequence/boot logic 214 receives the input signal 112. Based on the input signal 112, the multiplexer control logic 216 can send an appropriate control signal 110 to multiplexer 104 based on which interconnect buses are active and which configuration is applied.

The inclusion of parts 200a-200d in central configuration logic 202 allows the configuration logic 202 to be, in effect, partitioned to correspond to the specified platform, with one of the parts 200a-200d corresponding to each available partition. For example, in a single platform setup where all processors 106a-106d are interconnected and operating as a common system (e.g., as in FIG. 1C), the configuration logic 202 may deactivate parts 200b-200d, such that only part 200a is active to configure all of the processors using BIOS 118a. Alternatively, the bus managers 204b-204d and/or the side-bank link/power manager 206b-206d can remain active for communicating with the respective processors 106b-106d, but sequence/boot logics 208b-208d are rendered inactive such that sequence/boot logic 208a can configure the processors 106b-106d using BIOS 118a. In still another alternative, parts 200a-200d are maintained in an active state, but are each forced by configuration logic 202 to use the same BIOS 118a and to set addresses for processors 106a-106d different from each other. In other partition setups that include more than one processor, the configuration logic 202 may activate some parts 200a-200d and deactivate other parts 200a-200d, similar to that described above for the single platform setup, such that one of the parts 200a-200d is active to configure the processors in each respective partition. In the multi-platform setup where all processors are isolated and operating as independent systems (e.g., as in FIG. 1A), the configuration logic 202 may activate all parts 200a-200d, with each part configuring its respective processor 106a-106d using its respective BIOS 118a-118d.

Figure 3:
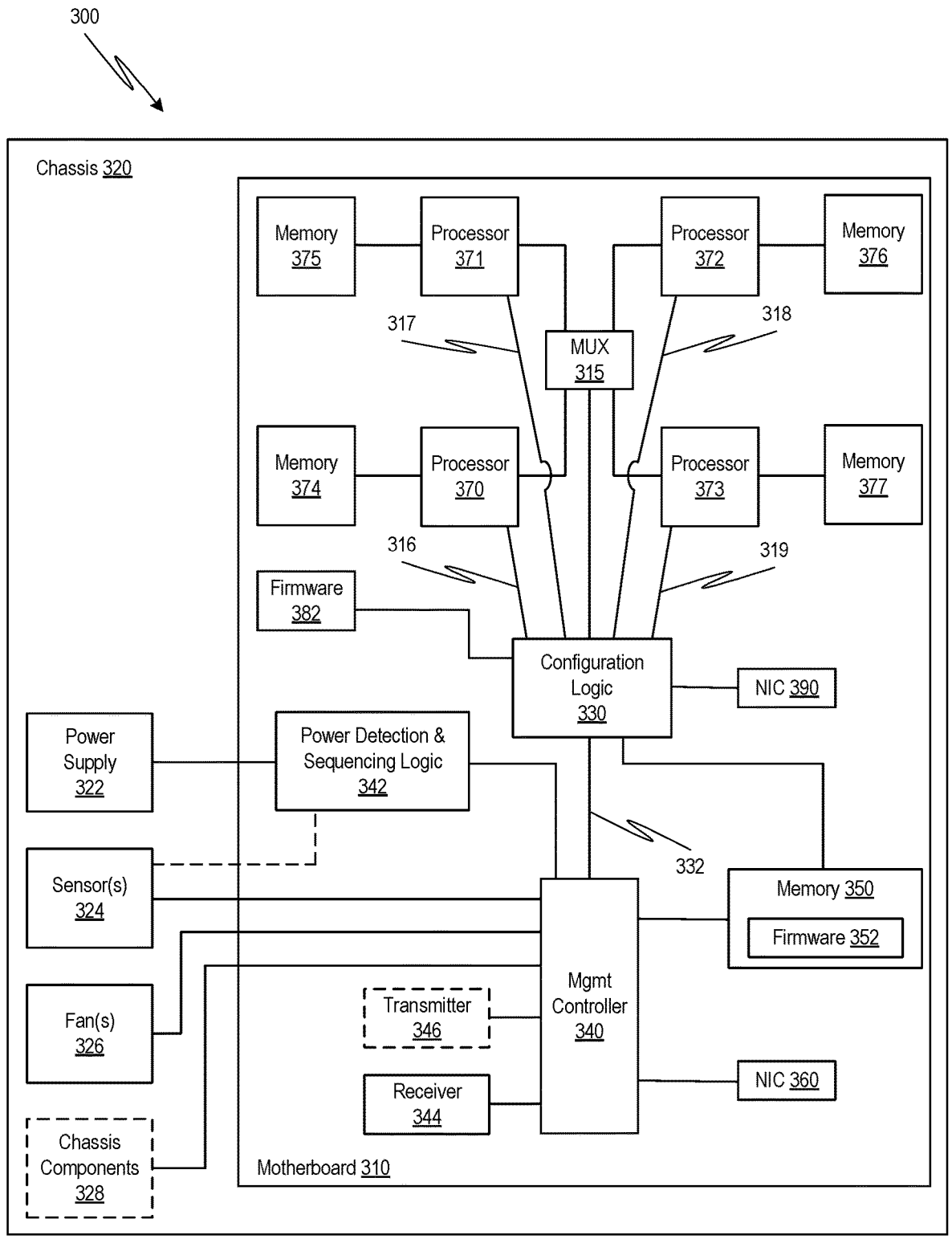
FIG. 3 is a simplified schematic diagram of a chassis of a server computer, according to one or more embodiments of the disclosed subject matter.

FIG. 3 is a system diagram showing an example of a computing system 300 including a motherboard 310 and a chassis 320 that could be used for the server computer, according to one or more embodiments. The chassis 320 can include a power supply 322, one or more sensors 324, one or more fans 326, and optional chassis components 328. The motherboard 310 can include a set of components that are common across multiple computing systems so that the motherboard 310 can be used in multiple different computing systems. The motherboard 310 can be installed within the chassis 320. A configuration logic 330 can be used to configure the motherboard in accordance with an input signal 332 from a management controller 340, which can be a BMC. Although only a single configuration logic 330 is illustrated in FIG. 3, system 300 can include more than one configuration logic, for example, in a master-servant relationship as discussed above with respect to FIGS. 1A-2A.

The computing system 300 can be connected to other components of a datacenter and power can be applied, such as by connecting the computing system 300 to an alternating current (AC) power source and/or toggling a power switch (not shown) of the chassis 320. The power supply 322 can convert energy from AC to direct current (DC) energy, which can be used to power the components of the chassis 320 and the motherboard 310. Power detection and sequencing logic 342 can be used to detect when the power supply outputs are within stable operating parameters. For example, after the power is initially switched on, it can take time for one or more of the power supply outputs to ramp to an appropriate output DC voltage. The power detection and sequencing logic 342 can sense the voltage of the power supply outputs and can indicate when the voltage is within operational parameters (such as within +/−10% of a predefined voltage). When a power supply output transitions to an operational state, the power detection and sequencing logic 342 can perform a power-up sequence and/or a reset sequence. For example, power can be applied to one portion of the motherboard 310 before other portions of the motherboard. As another example, one portion of the motherboard 310 can be placed in or taken out of reset at a different time than a different portion of the motherboard. As a specific example, management controller 340 and its associated components can be brought out of reset (e.g., a reset signal connected to the management controller 340 can be de-asserted) before any processors (such as processors 370-373).

The management controller 340 can be coupled to a receiver 344, which can receive an external input on how to configure the system 300. For example, during operation of the system 300, the management controller 340 can receive a signal at receiver 344 indicating a desired platform configuration for the system 300, for example, to accommodate client specifications or system demand. The management controller 340 can proceed to initialize the system 300, for example, by performing a reset and subsequent power-on sequence, or can direct the system 300 to reconfigure while the processors 370-373 are operating (e.g., "hot" add/drop). Alternatively or additionally, during a power-on event sequence, the management controller 340 can activate a transmitter 346 which can be used to elicit a response describing how to perform configuration. The response can be received in the receiver 344, which can, in turn, cause the management controller 340 to start initialization of the system.

For example, the management controller 340 can execute initialization software stored in memory 350. The initialization software can determine any programmable settings corresponding to the received signal. Alternatively or additionally, a network interface card (NIC) 360 can be used to communicate with devices (such as server computers) connected to a management network, and such communications can control how the management controller 340 should initialize the system. Thus, configuration software modules can be downloaded from a server computer attached to the NIC 360. As another example, the configuration software can be read from a storage device (not shown) of the computing system 300 and loaded into the memory 350. Thus, there are multiple possible techniques that can be used to begin initialization of the management controller.

The retrieved configuration software can be stored in non-volatile memory that is directly or indirectly accessible by the management controller 340. For example, the configuration software can be software modules that are stored in firmware 352 and/or firmware 382. The firmware 352 and 382 can be used to control one or more components integrated with or controlled by the motherboard 310, such as components of the chassis 320. The firmware 382 can be used to program the configuration logic 330. For example, the configuration logic can be an FPGA and the hardware can be programmed therein after a reset. Once the configuration logic 330 is properly programmed, the management controller 340 can program the input signal 332 so as to configure the server computer 300 into a particular platform setup or interconnect topology, as described above.

The management controller 340 can receive instructions from NIC 360 or the receiver 344 as to how to configure the input signal 332. Alternatively, the management controller 340 can have non-volatile configuration instructions stored in memory 350 that are available automatically upon start-up. The input signal 332 can be as simple as a single bit that is either set or cleared. Alternatively, multiple bits can be used. Thus, in some embodiments, the management controller 340 can control configuration of processors 370-373 and multiplexer 315 via the configuration logic 330. In other embodiments, another component on the motherboard 310 or external to system 300 can provide the input signal 332 to the configuration logic 330 that instructs configuration of system 300 into the desired platform setup or interconnect topology.

The configuration logic 330 can be used to manage communications between the processors 370-373 and other components of the motherboard 310 and the chassis 320. For example, the configuration logic 330 can include one or more bridges for converting between different signaling protocols. As a specific example, the processor 370 can communicate with the configuration logic 330 using a high-speed front-side bus and the NIC 390 can communicate with the configuration logic 330 using an input/output (I/O) protocol, such as peripheral component interconnect (PCI), or PCI-Express. The configuration logic 330 can convert between and manage communications between the different protocols so that the processor 370 can communicate with the NIC 390 through the configuration logic 330. When processors 370-373 are Intel® processors, the configuration logic 330 may operate as one or more Platform Controller Hubs (PCH).

In the case where a single-platform setup is configured, the configuration logic 330 can configure or boot all processors 370-373. In the single-platform mode, the configuration logic 330 can further instruct multiplexer 315 such that the processors 370-373 are fully connected to each other. The configuration logic 330 can further configure processors 370-373 such that one processor (e.g., processor 370) serves as the main processor and is coupled to memories 374-377, while the other processors (e.g., processors 371-373) serve as servant processors and are decoupled from their respective memories (e.g., memories 375-377). Thus, processor 370 would have access to all memories 374-377, which can be configured as a single, contiguous memory. The communication bus 316 between the main processor 370 and the configuration logic 330 can be enabled, while the communication buses 317-319 between the configuration logic 330 and the other processors 371-373 can be disabled. As a result, all processors 370-373 operate as a single platform.

In the case where a multi-platform setup is configured, the configuration logic 330 can instruct multiplexer 315 to isolate each processor 370-373 from each other. Communication buses 316-319 between each processor 370-373 and the configuration logic 330 can also be enabled. The configuration logic 330 can separately boot each processor 370-373 using respective buses 316-319 and BIOS s. Moreover, each processor 370-373 has its own memory 374-377, respectively. As a result, each processor 370-373 operates independently on a platform separate from the other processors. Communication between the processors 370-373 can occur through I/O registers within the configuration logic 330.

In the case where a dual-platform setup is configured, the configuration logic 330 can instruct multiplexer 315 to connect together separate pairs of the processors 370-373, for example, by connecting processor 370 to processor 371 and processor 372 to processor 373. The configuration logic 330 can further configure processors 370-373 such that one processor in each pair (e.g., processor 370 and processor 373) serves as the main processor and is coupled to respective memories of the pair (e.g., memories 374-375 for processor 370 and memories 376-377 for processor 373). The other processors (e.g., processors 371-372) serve as servant processors in their respective pairs and are decoupled from their respective memories (e.g., memories 375-376). Thus, processor 370 would have access to memories 374-375, which can be configured as a single, contiguous memory, and processor 373 would have access to memories 376-377, which can also be configured as a separate single, contiguous memory. Communication buses between one of the processors from each pair (e.g., bus 316 of processor 370 and bus 319 of processor 373) and the configuration logic 330 can be enabled, while the remaining communication buses are disabled (e.g., buses 317-318). The configuration logic 330 can boot the first pair of processors 370-371 using bus 316 and a first BIOS, and can separately boot the second pair of processors 372-373 using bus 319 and a second BIOS. As a result, the first pair of processors 370-371 operates independently on a platform separate from the second pair of processors 372-373. Communication between the separate pairs of processors can occur through I/O registers within the configuration logic 330.

Figure 4A:
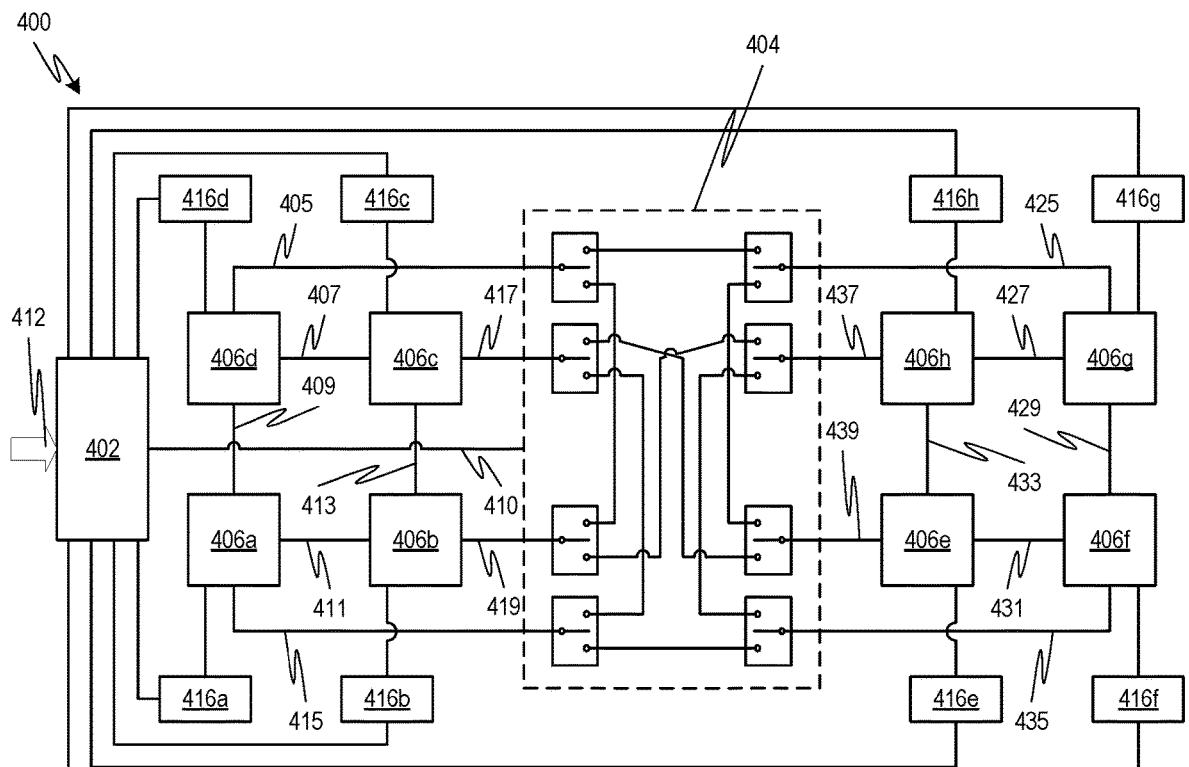
FIG. 4A is a simplified schematic diagram of another server computer, including one or more multiplexers for reconfiguration of interconnects buses to arbitrarily control the partitioning or topology architecture, according to one or more embodiments of the disclosed subject matter.
Figure 4B:
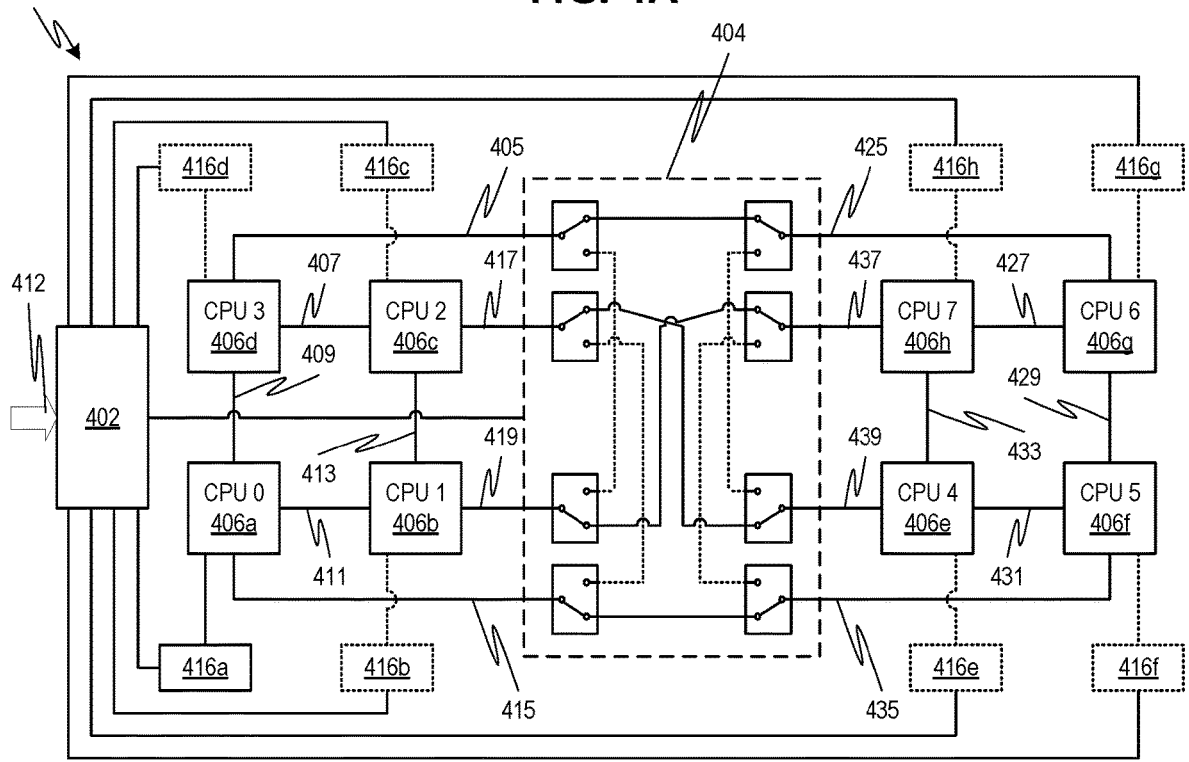
FIG. 4B illustrates an exemplary configuration for the server computer of FIG. 4A in a single-partition setup.
Figure 4C:
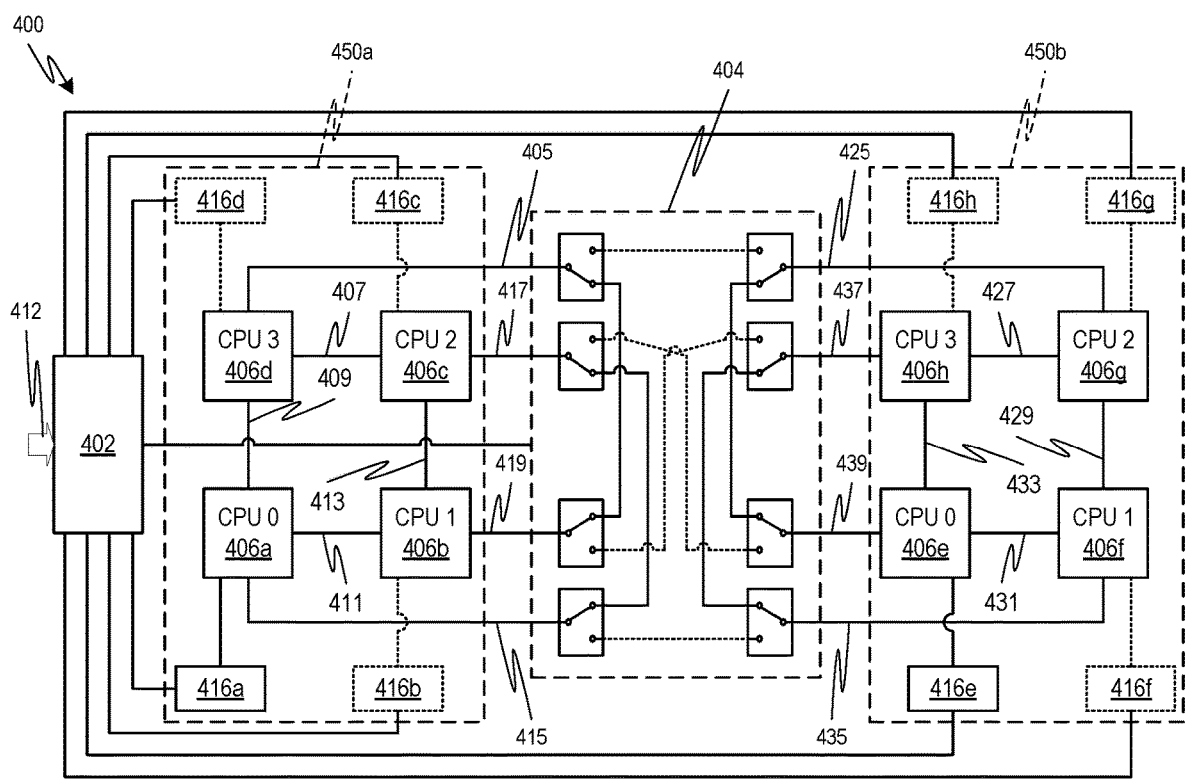
FIG. 4C illustrates an exemplary configuration for the server computer of FIG. 4A in a two-partition setup.

Although only four processors are shown in FIGS. 1-3 and discussed above, embodiments of the disclosed subject matter are not limited thereto. Rather, the above teachings can be readily extended to different numbers of processors in a similar manner. For example, FIGS. 4A-4C illustrates a server computer 400 with eight processors 406a-406h that can be reconfigured to provide multiple configuration alternatives based on an input signal 412 received at an input port of master configuration logic 402. Based on input signal 412, master configuration logic 402 can control one or more multiplexers 404 (via control line 410) to configure the server computer 400 as a single-platform (e.g., single partition with eight interconnected processors, as in FIG. 4B) or as a dual-platform (e.g., two partitions 450a, 450b with four interconnected processors each, as in FIG. 4C). As with the above described embodiments, the separate platforms can be logically independent from each other, with each running a separate operating system having different memory maps, separate memory, etc. Each platform can further include its own separate configuration logic 416a-416h, which may operate in a servant relationship to configuration logic 402 operating as a master. Master configuration logic 402 and/or servant configuration logic 416a-416h can be an IC, such as an FPGA or an ASIC.

Each processor 406a-406d can have three or more interconnect links with interconnect buses respectively coupled thereto. For example, processor 406d has a first interconnect bus 405 connect to the multiplexer 404, a second interconnect bus 407 connected to processor 406c, and a third interconnect bus 409 connected to processor 406a. However, different numbers of interconnect links (and corresponding number of interconnect buses) are also possible according to one or more contemplated embodiments, for example, based on the design or type of processors 406-406h.

Interconnect buses 405, 415, 417, 419, 425, 435, 437, and 439 can be connected to multiplexer 404 and rerouted or enabled/disabled according to the desired platform configuration or interconnect topology. Interconnect buses 407, 409, 411, 413 may directly connect processors 406a-406d together, and interconnect buses 427, 429, 431, 433 may directly connect processors 406e-406h together. Alternatively, interconnect buses 407, 409, 411, 413, 427, 429, 431, 433 can also be connected to multiplexer 404, or one or more other multiplexers, in a manner similar to multiplexer 104 in FIGS. 1A-1D. In such alternatives, the additional connections to a multiplexer may allow server computer 400 to have additional platform configurations, for example, eight partitions with a single processor each, four partitions with two processors each, or any other arbitrary or custom partition configuration or interconnect topology.

The multiplexer 404 can be a type of peripheral component interconnect (PCI) switch or any other switch that allows signals between processors without compromising the coherent communication protocol. The multiplexer 404 can be mounted on, or form part of, the same motherboard or other printed circuit board as processors 406a-406h and configuration logic 402. Although only one multiplexer 404 is illustrated in FIGS. 4A-4C, additional multiplexers can be used. For example, the same function offered by multiplexer 404 can be achieved using two or more separate multiplexer units.

In the single-platform configuration shown in FIG. 4B, the multiplexer 404 is configured such that all eight processors 406a-406h are interconnected. For example, processors 406d, 406g are connected together via interconnect buses 405, 425, processors 406a, 406f are connected together via interconnect buses 415, 435, processors 406c, 406h are connected together via interconnect buses 417, 437, and processors 406b, 406e are connected together via interconnect buses 419, 439. Processors 406a-406d are also interconnected by interconnect buses 407, 409, 411, 413, while processors 406e-406h are also interconnected by interconnect buses 427, 429, 431, 433. The master configuration logic 402 also sends an enabling control signal to only one servant configuration logic in the server computer 400. For example, servant configuration logic 416a can be enabled, while all other servant configuration logics 416b-416h are disabled. Enabled servant configuration logic 416a can boot up all processors 406a-406h using a first BIOS (not shown). Alternatively, as noted above, the server computer 400 can be configured (e.g., via appropriate programming) to allow "hot" changes to connect or disconnect processors without reboot.

Servant configuration logic 416a can further set the address for processor 406a as a first address (e.g., CPU 0). Servant configuration logic 416a, master configuration logic 402, or the respective servant configuration logics 416b-416h can set different addresses for the other processors 406b-406h (e.g., CPU 1 thru CPU 7 in FIG. 4B). Thus, all processors 406a-406h can operate in a common memory map of the system, with the interconnect buses allowing coherent inter-processor communication so that the processors 406a-406h can cooperate in servicing the single platform. The server computer 400 can thus provide a single partition operating with all of the processors 406a-406h interconnected.

In the dual-platform configuration show in FIG. 4C, the multiplexer 404 is configured to form two separate partitions 450a, 450b with four processors each. For example, processors in each partition 450a, 450b can be connected together in a fully connected configuration. In other words, each processor in the partition is connected to the three other processors in the partition by respective interconnected buses. For example, processor 406a is connected to processor 406b by interconnect bus 411, to processor 406d by interconnect bus 409, and to processor 406c by interconnect buses 415 and 417 (via multiplexer 404). Similarly, processor 406e is connected to processor 406f by interconnect bus 435, to processor 406h by interconnect bus 433, and to processor 406g by interconnect buses 439 and 425 (via multiplexer 404).

The master configuration logic 402 also sends an enabling control signal to only one servant configuration logic in each partition 450a, 450b. For example, servant configuration logics 416a, 416e can be enabled, while all other servant configuration logics 416b-416d and 416f-416h are disabled. Enabled servant configuration logic 416a can boot up processors 406a-406d using a first BIOS (not shown), and enabled servant configuration logic 416e can boot up processors 406e-406h using a separate second BIOS (not shown). Alternatively, as noted above, the server computer 400 can be configured (e.g., via appropriate programming) to allow "hot" changes to connect or disconnect processors without reboot.

Servant configuration logic 416a can further set the address for processor 406a as a first address (e.g., CPU 0). Servant configuration logic 416a, master configuration logic 402, or the respective servant configuration logics 416b-416d can set different addresses for the other processors 406b-406d (e.g., CPU 1 thru CPU 3 in FIG. 4C). Thus, all processors 406a-406d can operate in a common memory map of partition 450a, with the interconnect buses allowing coherent inter-processor communication so that the processors 406a-406d can cooperate in servicing the first platform. Similarly, servant configuration logic 416e can set the address for processor 406e as a first address (e.g., CPU 0). Servant configuration logic 416e, master configuration logic 402, or the respective servant configuration logics 416f-416h can set different addresses for the other processors 406f-406h (e.g., CPU 1 thru CPU 3 in FIG. 4C). Thus, all processors 406e-406h can operate in a common memory map of partition 450b, with the interconnect buses allowing coherent inter-processor communication so that the processors 406e-406h can cooperate in servicing the second platform. The server computer 400 can thus provide two independently operating platforms, each with four processors therein that are isolated from processors in the other platform.

Figure 5A:
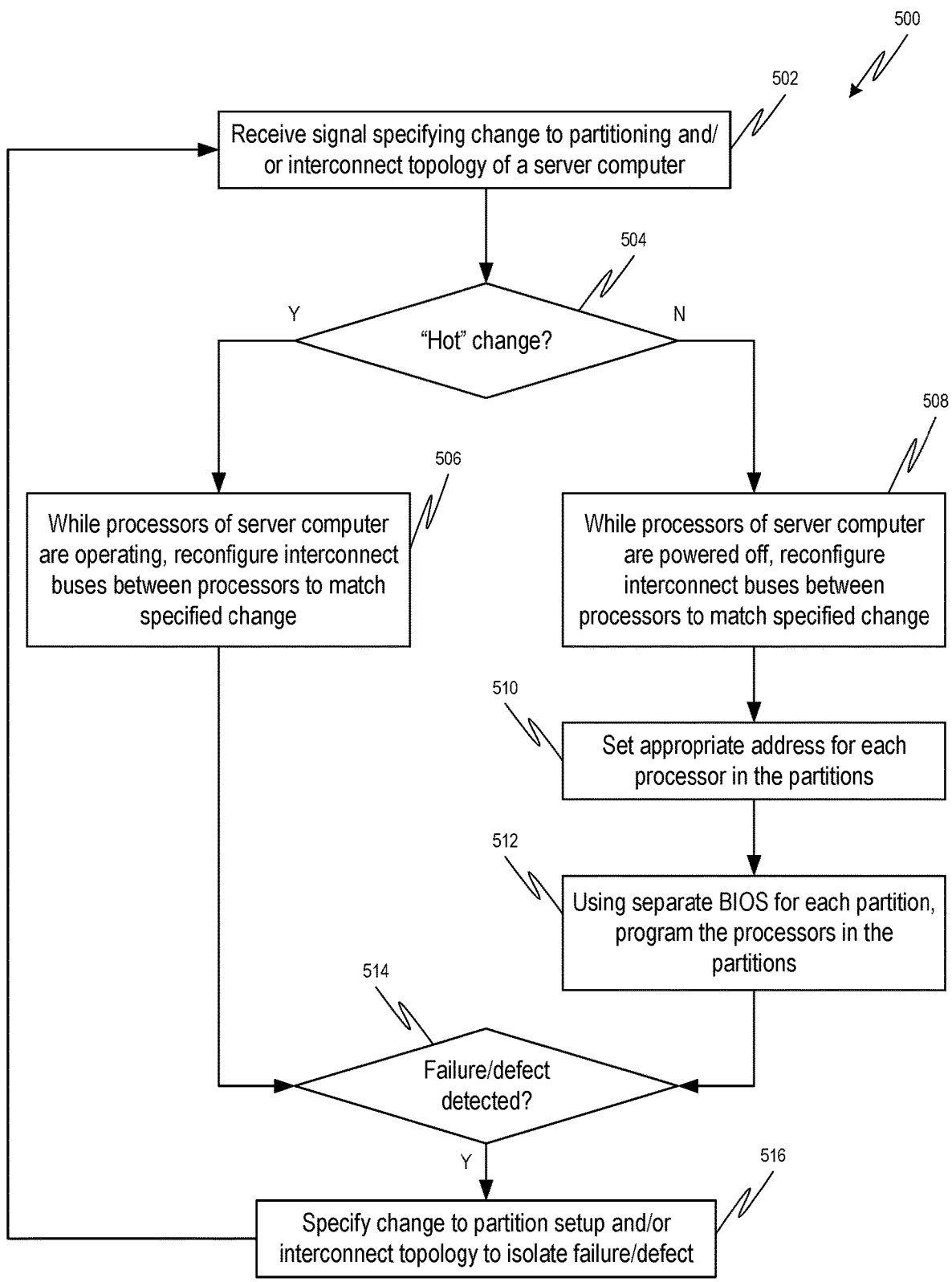
FIG. 5A is a generalized process flow diagram for configuring multiple processors in a server computer, according to one or more embodiments of the disclosed subject matter.

FIG. 5A is a flow diagram for an exemplary process 500 for configuring processors in a server computer. At 502, a configuration signal can be received that specifies whether a desired partition setup or change in interconnect topology of a server computer. For example, a configuration signal 112 is received by the configuration logic 102 in FIGS. 1A-1D, or a configuration signal 412 is received by the configuration logic 402 in FIGS. 4A-4C. The configuration signal can be received from a variety of sources. For example, in FIGS. 2A-2B at 212, the configuration signal is from an embedded controller (EC), a BMC or other I/O. FIG. 3 shows a particular example wherein a management controller 340 provides the configuration signal 332. Other sources can be used.

The process 500 can proceed to 504, where it is determined whether the server computer is capable of performing the specified change as a "hot" change, i.e., without powering off or rebooting the processors of the server computer. For example, the server computer can include programming (e.g., as part of the hypervisor) that allows addition or deletion of processors to a virtual machine without rebooting or power down. If the server computer is capable of a "hot" change, the process can proceed to 506, where interconnect buses between processors are reconfigured (e.g., routed, enabled, or disabled) to achieve the specified platform configuration while the processors are operating. If the server computer requires powering off or rebooting to effect the specified change, the process instead proceeds to 508, where interconnect buses between processors are reconfigured (e.g., routed, enabled, or disabled) to achieve the specified platform configuration or interconnect topology once the processors are powered off. For example, the configuration logic 102 in FIGS. 1A-1D can send a control signal to multiplexer 104 to provide a single-partition setup, a dual-partition setup, or a multi-partition setup for four processors of a server computer 100, or configuration logic 402 in FIGS. 4A-4C can send a control signal to multiplexer 404 to provide a single-partition setup, a dual-partition setup, or a multi-partition setup for eight processors of a server computer 400.

After 508, the process can proceed to 510, where configuration logic sets the address for each processor in the partitions. For example, configuration logic 102 and/or configuration logic 116a-116d in FIGS. 1A-1D can set the addresses for the processors 106a-106d, or configuration logic 402 and/or configuration logic 416a-416h in FIGS. 4A-4C can set the addresses for the processors 406a-406h. Processors in the same partition can be set to have different addresses, while processors in different partitions may have the same address since they operate independently. The process 500 can then proceed to 512, where each processor is programmed using a respective BIOS. In some embodiments, 510 and 512 may be combined together, where address setting 510 is part of the programming of 512.

In some embodiments, the process 500 can further include detection of an error condition at 514, such as a failed processor or interconnect defect in the server computer. For example, the error condition can be detected by the master configuration logic (e.g., 102, 402), servant configuration logic (e.g., 116a-d, 416a-416d), a separate module of the server computer (e.g., management controller 340), or a module external to the server computer (e.g., administrator server 640 or management server computer 604). If an error condition is detected at 514, the process can proceed to 516, where a change to the partition setup or the interconnect topology can be specified to isolate, or at least mitigate impact of, the error. From 516, the process can return to 502 where a signal corresponding to the specified change in 516 is received by the configuration logic and the process repeats to effect the specified change. In some embodiments, the return to 502 may include changing the partition setup or the interconnect topology to compensate for the isolated error, for example, by adding a processor to a partition to compensate for the failed processor.

Figure 5B:
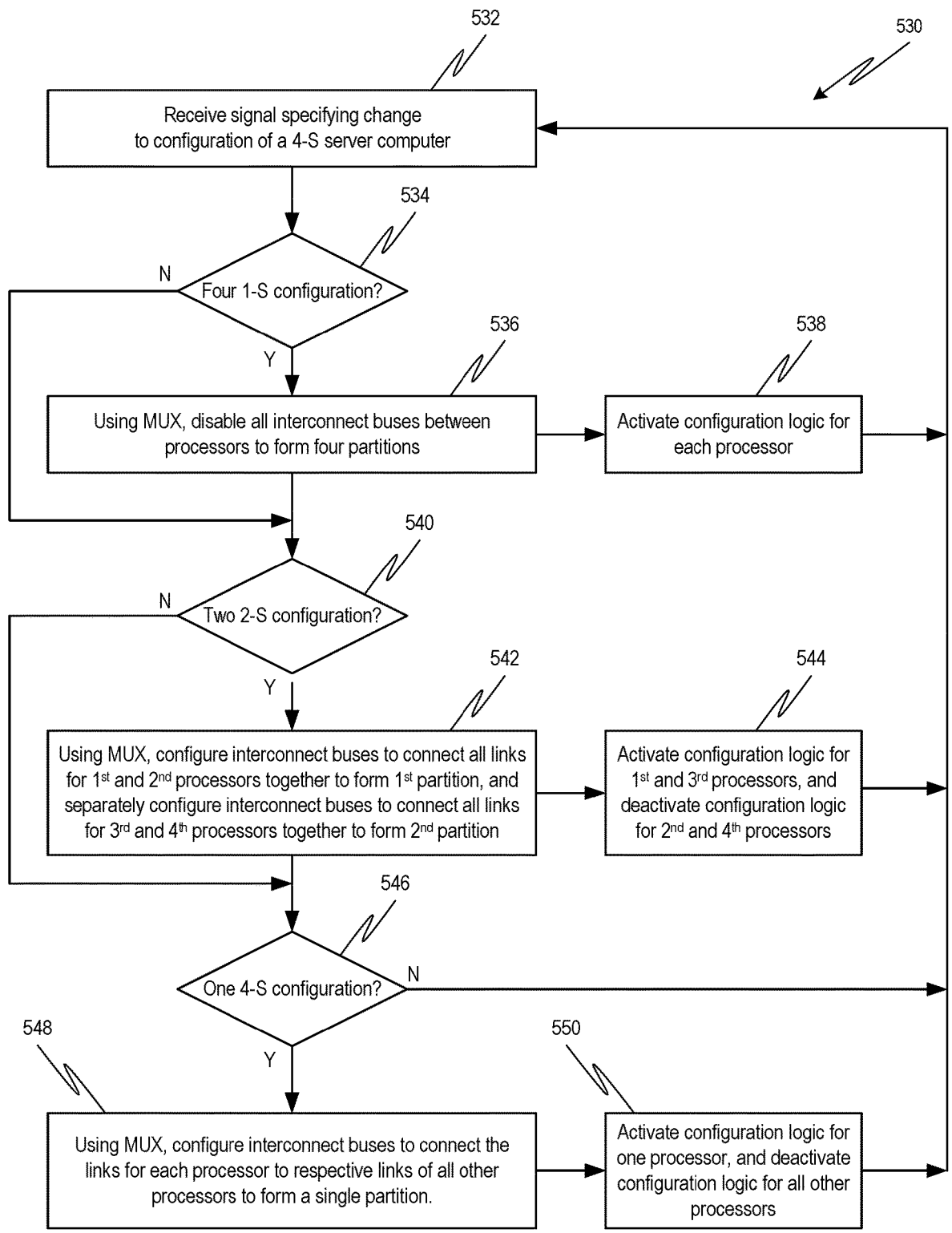
FIG. 5B is a process flow diagram for partition configuration in a server computer having four processors, according to one or more embodiments of the disclosed subject matter.

FIG. 5B is a flow diagram of an exemplary process 530 for configuring a server computer with four processors into one or more partitions. The process 530 can initiate at 532 where an input signal is received to control whether the server computer is in a single-partition mode (e.g., single 4-S), a dual-partition mode (e.g., two 2-S), or a multi-partition mode (e.g., four 1-S). As noted above, input signal 112 can be received from a variety of sources, such as an EC, a BMC or other I/O, such as a signal received from a separate server computer. If the received signal specifies a multi-partition configuration, then the process can proceed to 536 via decision block 534. Otherwise, if the received signal specifies a dual-partition configuration, the process can proceed to 542 via decision block 540. Otherwise, if the received signal specifies a single-partition configuration, the process can proceed to 548 via decision block 546.

At 536, one or multiplexers are used to disable all interconnect buses between processors of the server computer, thereby isolating the four processors into separate independent partitions. For example, the configuration logic 102 can instruct multiplexer 104 to disable interconnect bus sets 108a-108d, as in FIG. 1A. The process can proceed to 538, where the configuration logic is activated in each partition and each processor is programmed (e.g., configured with an appropriate BIOS and set with a particular address). For example, the servant configuration logics 116a-116d can be activated by master configuration logic 102 to configure the respective processors 106a-106d. Alternatively, a single configuration logic 202 can be partitioned into separate parts 200a-200d to serve as the independent configuration logic in each partition, as in FIG. 2B. Since each partition operates independently, each processor can be programmed using a separate BIOS and set to the same address (e.g., CPU 0). The process 500 can then repeat at 532 when another input signal is received.

At 542, one or more multiplexers are used to divide the four processors of the server computer into interconnected pairs. For example, the configuration logic 102 can instruct multiplexer 104 to connect the bus sets 108a, 108d for processors 106a, 106d together, and to separately connect the bus sets 108b, 108c for processors 106b, 106c together, as in FIG. 1B. The interconnected pairs of processors thus form separate partitions that can operate independently from each other. Moreover, since the interconnection between processor pairs in each partition can utilize more than one interconnect bus, the inter-processor communication within each partition may offer a higher bandwidth (e.g., in FIG. 1B, three times the bandwidth of a single interconnect bus). The process can then proceed to 544, where one configuration logic is activated in each partition and each processor is programmed (e.g., configured with an appropriate BIOS and set with a particular address). For example, servant configuration logic 116a can be activated by master configuration logic 102 to configure the processors 106a, 106d in the first partition, and servant configuration logic 116b can be activated by master configuration logic 102 to configure the processors 106b, 106c in the second partition, as in FIG. 1B. Alternatively, a single configuration logic 202 can be partitioned into two parts 200a, 200b to serve as the independent configuration logic in each partition, as in FIG. 2B. Each processor in the same partition can be programmed using the same BIOS. An address for the first processor in each partition can be set to a first address (e.g., CPU 0), while an address for the second processor in each partition can be set to a different second address (e.g., CPU 1). The process 500 can then repeat at 532 when another input signal is received.

At 548, one or more multiplexers are used to connect together the four processors of the server computer, thereby forming a single partition. For example, the configuration logic 102 can instruct multiplexer 104 to connect all the bus sets 108a-108d together in a fully connected configuration, as in FIG. 1C. The process can then proceed to 550, where one configuration logic is activated for the four processors, and each processor is programmed (e.g., configured with an appropriate BIOS and set with a particular address). For example, servant configuration logic 116a can be activated by master configuration logic 102 to configure processors 106a-106d, as in FIG. 1C. Alternatively, a single configuration logic 202 can utilize one of parts 200a-200d to serve as the configuration logic for the server computer, as in FIG. 2B. Each processor in the server computer can be programmed using the same BIOS. An address for a first processor can be set to a first address (e.g., CPU 0), while the addresses for the other processors can be set to different sequential addresses (e.g., CPU 1-CPU 3). The process 530 can then repeat at 532 when another input signal is received.

Figure 5C:
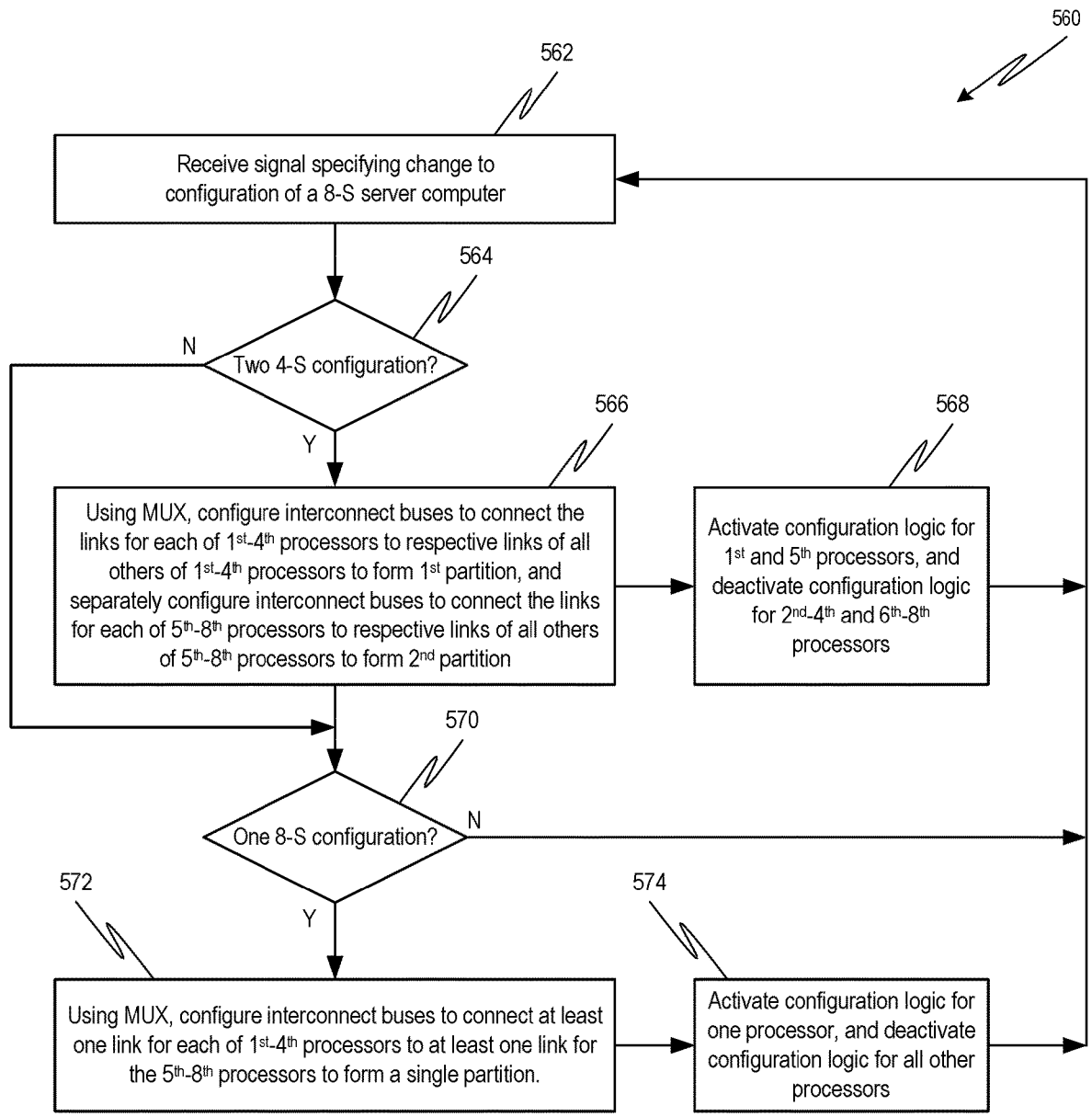
FIG. 5C is a process flow diagram for partition configuration in a server computer having eight processors, according to one or more embodiments of the disclosed subject matter.

FIG. 5C is a flow diagram of an exemplary process 560 for configuring a server computer with eight processors into one or more partitions. The process 560 can initiate at 562 where an input signal is received to control whether the server computer is in a single-partition mode (e.g., single 8-S) or a dual-partition mode (e.g., two 4-S). As noted above, input signal 412 can be received from a variety of sources, such as an EC, a BMC or other I/O. If the received signal specifies a dual-partition configuration, the process can proceed to 566 via decision block 564. Otherwise, if the received signal specifies a single-partition configuration, the process can proceed to 572 via decision block 570.

At 566, one or more multiplexers are used to divide the eight processors of the server computer into separated interconnected groups of four. For example, the configuration logic 402 can instruct multiplexer 404 to connect the interconnect buses 405, 419 for processors 406d, 406b together and to connect the interconnect buses 415, 417 for processors 406a, 406c together, as in FIG. 4C. The multiplexer 404 can further connect the interconnect buses 425, 439 for processors 406g, 406e together and the interconnect buses 435, 437 for processors 406f, 406h together. The interconnected set of four processors thus form separate partitions 450a, 450b that can operate independently from each other. The process can then proceed to 568, where one configuration logic is activated in each partition and each processor is programmed (e.g., configured with an appropriate BIOS and set with a particular address). For example, servant configuration logic 416a can be activated by master configuration logic 402 to configure the processors 406a-406d in the first partition 450a, and servant configuration logic 416e can be activated by master configuration logic 402 to configure the processors 406e-406h in the second partition 450b, as in FIG. 4C. Alternatively, a single configuration logic 202 can be partitioned into two parts 200a, 200b to serve as the independent configuration logic in each partition, as in FIG. 2B. Each processor in the same partition can be programmed using the same BIOS. An address for the first processor in each partition can be set to a first address (e.g., CPU 0), while an address for the other processors in each partition can be set to a different sequential address (e.g., CPU 1-CPU 3). The process 560 can then repeat at 562 when another input signal is received.

At 572, one or more multiplexers are used to connect together the eight processors of the server computer, thereby forming a single partition. For example, the configuration logic 402 can instruct multiplexer 404 to connect interconnect bus 405 to interconnect bus 425, interconnect bus 417 to interconnect bus 439, interconnect bus 419 to interconnect bus 437, and interconnect bus 415 to interconnect bus 435, as in FIG. 4B. The process can then proceed to 574, where one configuration logic is activated for the eight processors, and each processor is programmed (e.g., configured with an appropriate BIOS and set with a particular address). For example, servant configuration logic 416a can be activated by master configuration logic 402 to configure processors 406a-406h, as in FIG. 4B. Alternatively, a single configuration logic 202 can utilize one of parts 200a-200d to serve as the configuration logic for the server computer, as in FIG. 2B. Each processor 406a-406h in the server computer can be programmed using the same BIOS. An address for a first processor can be set to a first address (e.g., CPU 0), while the addresses for the other processors can be set to different sequential addresses (e.g., CPU 1-CPU 7). The process 560 can then repeat at 562 when another input signal is received.

Although the processes of FIGS. 5A-5C have been illustrated and discussed separately, the features described therein can also be combined according to one or more contemplated embodiments. For example, the features described in FIG. 5B can be applied to the process of FIG. 5C, where the process 530 of partitioning four processors (e.g., one 4S, two 2S, or four 1S) is a subset of partitioning eight processors (e.g., one 8S, two 4S, four 2S, or eight 1S). Thus, the two 2S partitioning of FIG. 1B can be combined with the two 4S partitioning of FIG. 4C to yield an effective four 2S partitioning. Similarly, the four 1S partitioning of FIG. 1A can be combined with the partitioning of FIG. 4A to yield an effective eight 1S partitioning. In another example, the features of FIG. 5A relating to isolation of a failure or defect can be applied in both FIGS. 5B-5C.

Figure 6:
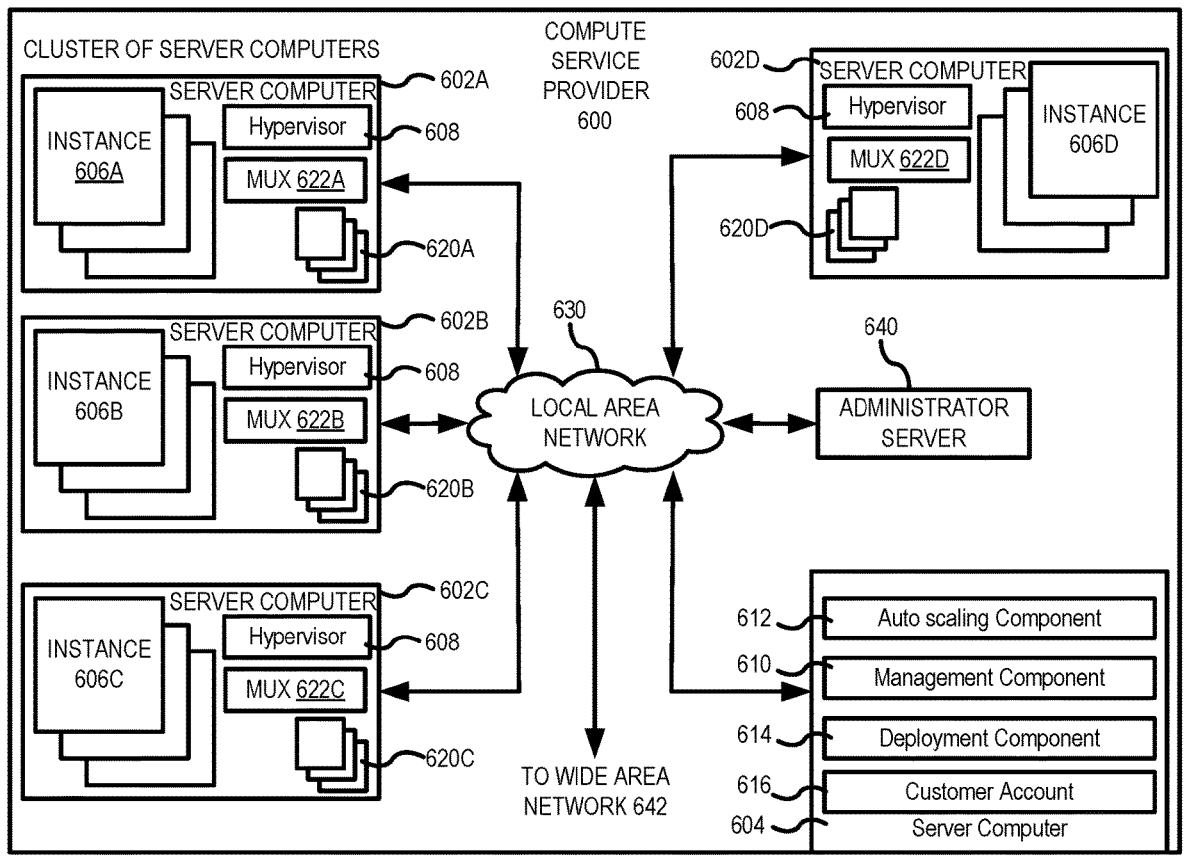
FIG. 6 is a simplified schematic diagram illustrating a plurality of virtual machine instances running in a multi-tenant environment, according to one or more embodiments of the disclosed subject matter.

FIG. 6 is a computing system diagram of a network-based compute service provider 600 that illustrates one environment in which embodiments described herein can be used. The compute service provider 600 (e.g., a cloud provider) is capable of delivery of computing and storage capacity as a service to a community of end recipients. In an example embodiment, the compute service provider 600 can be established for an organization by or on behalf of the organization, for example, to offer a "private cloud environment." In another embodiment, the compute service provider 600 supports a multi-tenant environment, wherein a plurality of customers operates independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can include configuration logic, multiple processors 620A-620D, and respective multiplexers 622A-622D, as was described above and illustrated in FIG. 3, for example. The server computers 602A-602D can provide computing resources for executing software instances 606A-606D. In one embodiment, the instances 606A-606D are virtual machines. As known in the art, a virtual machine is an instance of a software implementation of a machine (e.g., a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured, for example, a number of processors to include in a partition running the new instance, a bandwidth (and corresponding number of interconnect buses) for inter-processor communication, or any other scheme for configuration of the server computers 602 and/or instances 606.

For example, the configuration from the deployment component 614 can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 616 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. A network 630 can be utilized to interconnect the server computers 602A-602D and the server computer 604. The network 630 can be a local area network (LAN) and can be connected to a wide area network (WAN) 642 so that end users can access the compute service provider 600. It should be appreciated that the network topology illustrated in FIG. 6 has been simplified and that many more networks and networking devices can be utilized to interconnect the various computing systems disclosed herein.

An administrative server computer 640 can be used to control a configuration of the server computers 602A-602D, for example, the configuration of processors 620A-620D. For example, the administrative server computer 640 can be coupled to the NIC 360 (FIG. 3) to signal to the management controller 340 for a desired partitioning of processors 370-373 and/or interconnect topology via control of multiplexers 315. In some embodiments, the administrative server 640 can instruct changes in partition configurations and/or interconnect topology of a particular server computer based on data or instructions received from deployment component 614. Alternatively or additionally, the administrative server 640 can limit how the server computers are configured based on a policy from the customer account 616.

Figure 7:
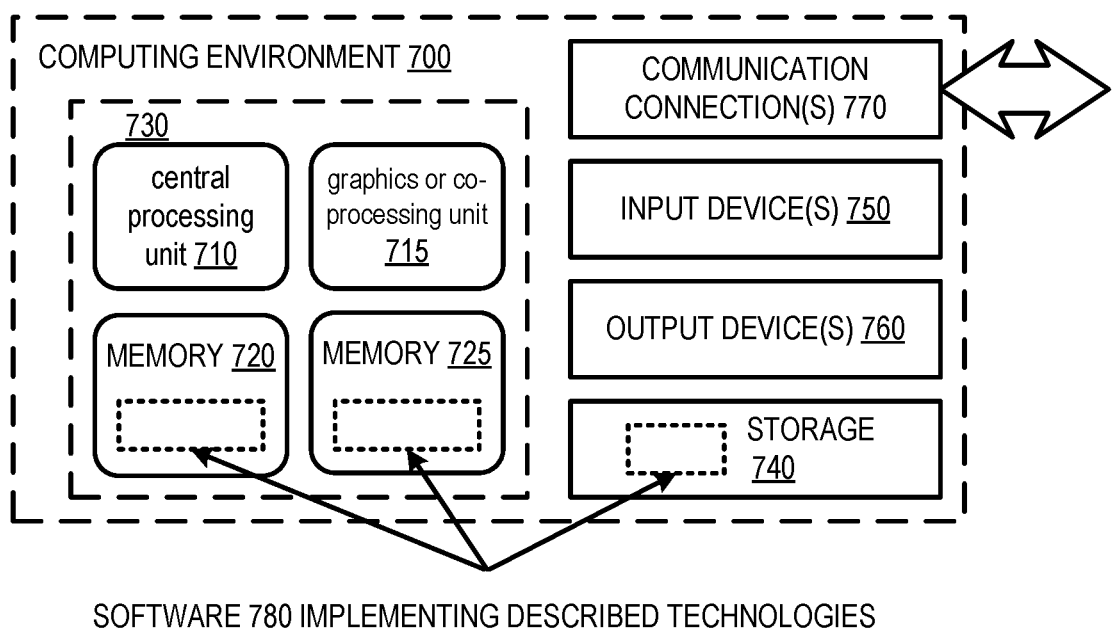
FIG. 7 is a simplified schematic diagram depicting a generalized example of a suitable computing environment in which the disclosed subject matter may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

The computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), a field-programmable gate array (FPGA), a graphics processing unit (GPU), an accelerator, or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). Although not shown, the configuration logic described herein can be used to configure processors 710 and 715.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of configuring multiple processors in a server computer, each of the multiple processors having at least first, second, and third interconnect buses coupled thereto, the method comprising:
    receiving configuration signals in configuration logic, the configuration signals indicating a partition setup for the server computer and comprising a first configuration signal indicating a single-partition setup, a second configuration signal indicating a two-partition setup, and a third configuration signal indicating a multi-partition setup where only one processor is in each partition;
    in response to the first configuration signal indicating the single-partition setup:
        causing a multiplexer to connect the first interconnect bus coupled to a first processor of the multiple processors together with the first interconnect bus coupled to a fourth processor of the multiple processors, the second interconnect bus coupled to the first processor together with the second interconnect bus coupled to a third processor of the multiple processors, the third interconnect bus coupled to the first processor together with the third interconnect bus coupled to a second processor of the multiple processors, the first interconnect bus coupled to the second processor together with the first interconnect bus coupled to the third processor, the second interconnect bus coupled to the second processor together with the second interconnect bus coupled to the fourth processor, and the third interconnect bus coupled to the third processor together with the third interconnect bus coupled to the fourth processor; and
        operating the first, second, third, and fourth processors with the connected interconnect buses providing coherent communication between the first, second, third, and fourth processors in the single partition;
    in response to the second configuration signal indicating the two-partition setup:
        causing the multiplexer to connect the first, second, and third interconnect buses coupled to the first processor together with the first, second, and third interconnect buses coupled to the fourth processor, respectively, to form a first partition;
        causing the multiplexer to connect the first, second, and third interconnect buses coupled to the second processor together with the first, second, and third interconnect buses coupled to the third processor, respectively, to form a second partition; and
        operating the multiple processors with the first, second, and third interconnect buses coupled to the first and fourth processors providing coherent communication between the first and fourth processor in the first partition and the first, second, and third interconnect buses coupled to the second and third processors providing separate coherent communication between the second and third processors in the second partition; and
    in response to the third configuration signal indicating the multi-partition setup:
        using the multiplexer, disabling any connections between the interconnect buses coupled to the multiple processors; and
        operating the multiple processors as separate individual partitions.

2. The method of claim 1, wherein a number of the processors in the server computer is at least four, each partition in the two-partition setup includes at least two processors, and the multi-partition setup has at least four partitions with a single processor in each.

3. The method of claim 1, further comprising detecting a defect or failure of one of the processors and generating one of the configuration signals in response to the detected defect or failure.

4. The method of claim 3, further comprising, in response to the generation of one of the configuration signals in response to the detected defect or failure:
    using the multiplexer to disable any interconnect buses coupled to each defective or failed processor; or
    for each defective or failed processor, using the multiplexer to connect each of a first, second, and third interconnect bus coupled to an additional processor of the multiple processors together with one of the interconnect buses coupled to the first, second, or third processor, so as to add the additional processor to compensate for each defective or failed processor.

5. The method of claim 1, wherein the connecting of the interconnect buses of the first, second, and third processors occurs while one of the first, second, and third processors is operating.

6. The method of claim 1, wherein the connecting of the interconnect buses of the first, second, and third processors occurs while the first, second, and third processors are powered down, and the method further comprises:
    in response to the first configuration signal indicating the single-partition setup, prior to the operating the processors in the single partition:

except for a first processor in the single partition, disabling buses between the configuration logic and each processor;
programming each processor using a first Basic Input/Output System (BIOS); and
setting each processor to a respective address, the processors having different set addresses from each other;
in response to the second configuration signal indicating the two-partition setup, prior to the operating the processors in the first and second partitions:
except for one of the processors in the first partition and one of the processors in the second partition, disabling buses between the configuration logic and each processor;
programming each processor in the first partition using a first BIOS and each processor in the second partition using a second BIOS; and
setting each processor to a respective address, the processors in the first partition having different set addresses from each other and the processors in the second partition having different set addresses from each other; and
in response to the third configuration signal indicating the multi-partition setup, prior to the operating the processors as the separate individual partitions:
programming each processor using a respective BIOS; and
setting each processor to a first address.

7. A method of configuring multiple processors in a server computer, the method comprising:
receiving configuration signals in configuration logic, the configuration signals indicating a partition setup for the server computer;
in response to a first configuration signal indicating a single-partition setup:
causing a multiplexer to route interconnect buses between the processors such that each processor is respectively connected to three others of the processors by three of the interconnect buses; and
operating the processors with coherent communication between the processors in the single partition;
in response to a second configuration signal indicating a two-partition setup:
causing the multiplexer to route the interconnect buses between the processors such that each processor in a first partition is respectively connected to one other processor in the first partition by one of the interconnect buses, and such that each processor in a second partition is respectively connected to one other processor in the second partition by one of the interconnect buses; and
operating the processors with coherent communication between the processors in the first partition and separate coherent communication between the processors in the second partition; and
in response to a third configuration signal indicating a multi-partition setup where only one processor is in each partition:
causing the multiplexer to disable the interconnect buses between each the processors; and
operating the processors as separate individual partitions,
wherein routing the interconnect buses occurs while the processors of the server computer are powered down, and the method further comprises:
in response to the first configuration signal indicating the single-partition setup, prior to the operating the processors in the single partition:
except for a first processor in the single partition, disabling buses between the configuration logic and each processor;
programming each processor using a first Basic Input/Output System (BIOS); and
setting each processor to a respective address, the processors having different set addresses from each other;
in response to the second configuration signal indicating the two-partition setup, prior to the operating the processors in the first and second partitions:
except for a first processor in the first partition and a first processor in the second partition, disabling buses between the configuration logic and each processor;
programming each processor in the first partition using a first BIOS and each processor in the second partition using a second BIOS; and
setting each processor to a respective address, the processors in the first partition having different set addresses from each other and the processors in the second partition having different set addresses from each other; and
in response to the third configuration signal indicating the multi-partition setup, prior to the operating the processors as the separate individual partitions:
programming each processor using a respective BIOS; and
setting each processor to a first address.

\* \* \* \* \*